US012306918B2

(12) United States Patent
Steelberg et al.

(10) Patent No.: US 12,306,918 B2
(45) Date of Patent: May 20, 2025

(54) COGNITIVE MULTI-FACTOR AUTHENTICATION (71) Applicant: VERITONE, INC., Denver, CO (US)

(72) Inventors: Chad Steelberg, Costa Mesa, CA (US); Albert Brown, San Juan Capistrano, CA (US)

(73) Assignee: VERITONE, INC., Irvine, CA (US)

( * ) Notice: Subject to any disclaimer, the term of this patent is extended or adjusted under 35 U.S.C. 154(b) by 419 days.

(21) Appl. No.: 17/538,988

(22) Filed: Nov. 30, 2021

(65) Prior Publication Data
US 2022/0269761 A1  Aug. 25, 2022

Related U.S. Application Data (63) Continuation of application No. PCT/US2020/035484, filed on May 31, 2020.

(60) Provisional application No. 62/855,796, filed on May 31, 2019.

(51) Int. Cl.
G06F 21/32 (2013.01)
G06F 3/01 (2006.01)
G06F 21/40 (2013.01)
G06V 40/16 (2022.01)
G06V 40/70 (2022.01)

(52) U.S. Cl.
CPC .............. *G06F 21/32* (2013.01); *G06F 3/017* (2013.01); *G06F 21/40* (2013.01); *G06V 40/172* (2022.01); *G06V 40/70* (2022.01); G06F 2221/2113 (2013.01)

(58) Field of Classification Search
CPC .......... G06F 21/32; G06F 3/017; G06F 21/40; G06F 2221/2113; G06V 40/70; G06V 40/172
USPC .......................................................... 726/19
See application file for complete search history.

(56) References Cited

U.S. PATENT DOCUMENTS

| | | | |
|---|---|---|---|
| 9,665,785 B2* | 5/2017 | Han | G06V 40/12 |
| 10,062,387 B2* | 8/2018 | Jiang | G10L 17/22 |
| 10,115,185 B2* | 10/2018 | Gibbon | G06F 18/28 |
| 10,146,981 B2* | 12/2018 | Sezan | G06V 40/13 |
| 10,170,135 B1* | 1/2019 | Pearce | G10L 25/03 |
| 10,311,646 B1* | 6/2019 | Wurmfeld | G07F 19/20 |
| 10,346,602 B2* | 7/2019 | Xiao | H04L 63/0861 |

(Continued)

Primary Examiner — Tauqir Hussain
(74) Attorney, Agent, or Firm — One LLP (57) ABSTRACT User authentication is an extremely important process in many applications and industries. Because of its importance, most security-sensitive user authentication processes employ an automatic multi-factor authentication process that involves confirming a SMS message, answering a security question, entering a PIN, etc. However, even these auto multi-factor authentication processes are vulnerable to attack and hack. For example, some facial recognition authentication processes can be defeated using a picture. Voice print can also be duplicated using a previous recording of the user's voice. As such, most financial institutions employ some form of human involvement (on top of multi-factor authentication) to authenticate a user for high security sensitive situations. The cost for performing authentication with human involvement can be very expensive. Accordingly, what is needed is an automatic multi-factor authentication process that is less prone to hack and workaround such as using a picture to defeat facial recognition processes.

20 Claims, 7 Drawing Sheets

(56) References Cited

U.S. PATENT DOCUMENTS

| | | | |
|---|---|---|---|
| 10,346,675 B1* | 7/2019 | Nagalla | G06V 40/172 |
| 10,372,962 B2* | 8/2019 | Wright | G06V 40/50 |
| 10,432,622 B2* | 10/2019 | Connell | H04L 63/0861 |
| 10,726,407 B2* | 7/2020 | Chandrasekaran | G06T 7/74 |
| 10,733,274 B2* | 8/2020 | Shin | G06F 21/31 |
| 10,733,275 B1* | 8/2020 | Knas | G06V 40/18 |
| 10,733,587 B2* | 8/2020 | Chandrasekaran | G06V 40/172 |
| 10,764,563 B2* | 9/2020 | Graumann | G06V 40/172 |
| 10,769,259 B2* | 9/2020 | Baldwin | G06N 3/045 |
| 10,810,451 B2* | 10/2020 | Edwards | G06V 40/70 |
| 10,817,246 B2* | 10/2020 | Yao | G06F 3/16 |
| 10,817,706 B2* | 10/2020 | Alvin | G06V 30/40 |
| 10,826,898 B2* | 11/2020 | Chandrasekaran | G06Q 20/40145 |
| 10,861,273 B2* | 12/2020 | Derakhshani | G06Q 20/18 |
| 10,885,168 B2* | 1/2021 | Braundmeier | H04L 63/20 |
| 10,949,517 B2* | 3/2021 | Trelin | G06V 40/40 |
| 10,956,544 B1* | 3/2021 | Knas | G06V 40/172 |
| 10,992,663 B2* | 4/2021 | Shieh | H04L 65/401 |
| 11,010,763 B1* | 5/2021 | Fillinger | G06Q 20/40145 |
| 11,037,150 B2* | 6/2021 | Van Os | G06Q 20/10 |
| 11,100,349 B2* | 8/2021 | Cohen | G06F 3/16 |
| 11,170,085 B2* | 11/2021 | Devine | G06V 40/166 |
| 11,200,309 B2* | 12/2021 | Cotterill | H04W 12/069 |
| 11,244,315 B2* | 2/2022 | Breed | G06Q 20/321 |
| 11,250,266 B2* | 2/2022 | Ton-That | G06V 40/45 |
| 11,386,189 B2* | 7/2022 | Van Os | G06F 3/016 |
| 11,393,258 B2* | 7/2022 | Van Os | G06V 40/50 |
| 11,449,746 B2* | 9/2022 | Baldwin | G06N 20/20 |
| 11,451,532 B2* | 9/2022 | Arif Khan | G06N 20/10 |
| 11,899,778 B2* | 2/2024 | Tao | G06F 21/45 |
| 2009/0109180 A1* | 4/2009 | Do | G06F 21/31 345/173 |
| 2010/0114573 A1* | 5/2010 | Huang | G10L 17/24 704/250 |
| 2013/0167212 A1* | 6/2013 | Azar | G06F 21/32 348/77 |
| 2013/0223696 A1* | 8/2013 | Azar | G06V 40/16 382/118 |
| 2014/0059673 A1* | 2/2014 | Azar | H04N 7/18 726/19 |
| 2014/0123275 A1* | 5/2014 | Azar | G06V 10/772 726/19 |
| 2016/0275375 A1* | 9/2016 | Kant | G06V 20/586 |
| 2017/0063852 A1* | 3/2017 | Azar | G06V 40/70 |
| 2017/0124385 A1* | 5/2017 | Ganong | G06F 16/50 |
| 2018/0082304 A1* | 3/2018 | Summerlin | G06Q 20/3229 |
| 2019/0253431 A1* | 8/2019 | Atanda | G06F 21/62 |
| 2020/0234297 A1* | 7/2020 | Murray | G06Q 20/3278 |

* cited by examiner

COGNITIVE MULTI-FACTOR AUTHENTICATION

CROSS-REFERENCE TO RELATED APPLICATIONS

This application is a continuation of International Patent Application Serial No. PCT/US20/35484, filed May 31, 2020, which claims priority to U.S. Provisional Patent Application No. 62/855,796, filed May 31, 2019, the disclosures of all of which are hereby incorporated by reference in their entireties.

BACKGROUND

Multi-factor authentication is an authentication process in which the user is required to authenticate the user's identity using two or more authentication elements such as passwords, SMS verifications, security questions, and pins. However, multi-factor authentication is not a failed-safe process. In many cases, identification theft can easily obtain sufficient information about a user to defeat some multi-factor authentication processes. Accordingly, what is needed is a more robust and secure way to conduct multi-factor authentication such that it is not prone to identification theft or hacking.

SUMMARY

Provided herein are embodiments of systems and methods for authenticating a user. One of the methods includes: requesting the user to verify identity using a first mode; analyzing a continuous video stream of the user, using a facial identification engine, to verify the user identity; requesting the user to perform an action while maintaining the continuous video stream; analyzing the continuous video stream to verify that the requested action is performed by the user using a second engine; and authenticating the user based on results of the first mode, the facial identification engine, and the second engine. The first mode can include one of a password verification process, a fingerprint verification process, a voice verification process, or an iris verification process.

The facial identification engine and the second engine can be the same engine. Alternatively, the facial identification engine and the second engine can be different engines. The second engine can be a voice identification engine (where the first engine is not a voice identification engine) or an object identification engine.

In some embodiments, requesting the user to perform an action comprises: requesting the user to turn the user's head in different directions; and analyzing the user's face to verify the user identity while the user's face is looking in different directions.

Requesting the user to perform an action can also comprise: requesting the user to read out loud a text displayed on a displaying device; receiving an input audio data in response to requesting the user to read out loud the text; analyzing the input audio data to verify the user identity, using a voice verification engine; and transcribing the input audio data to verify that the text displayed is read correctly.

In yet another embodiment, requesting the user to perform an action can comprise: requesting the user to follow audio or on-screen instructions; receiving an input audio data in response to requesting the user to follow audio or on-screen instructions; analyzing the input audio data to verify the user identity, using a voice verification engine; and transcribing the input audio data to verify that the user followed the audio or on-screen instructions.

In yet another embodiment, requesting the user to perform an action can comprise: requesting the user to follow audio or on-screen instructions; receiving an input video data in response to requesting the user to follow audio or on-screen instructions; and analyzing an input video data, using an object recognition engine, to verify that the user followed the audio or on-screen instructions.

The method for authentication can further comprise analyzing the continuous video stream to verify the user identity using the facial identification engine while the user is following the audio or on-screen instructions.

The method for authentication can further comprise analyzing the continuous video stream to verify the user identity using the facial identification engine while the user is following the audio or on-screen instructions.

In some embodiments, requesting the user to follow audio or on-screen instructions can comprise requesting the user to perform a specific act with the user's hand, object, or a part of the user's face. The specific act can comprise a gesture with one or more of the user's hands or fingers or an action with a desktop object (e.g., mouse, pencil, keyboard). Once the user is authenticated by two or modes, the user can be authenticated and is allowed to change the password.

In a second method for authenticating a user, the method includes: requesting the user to verify identity using a first mode (where the first mode is not an audio or video-based authentication mode); requesting the user to enable a real-time stream of data from the user's device; analyzing the real-time stream of data from the user's device to verify the user's identity using a first neural network; and authenticating the user based on results of the first mode and results from the first neural network. When requesting the user to enable a real-time stream of data from the user's device, the user is aurally or visually provided with an instruction to perform an action.

One of the systems for authenticating a user comprises: a memory and one or more processors coupled to the memory. The memory contains instructions, that when executed, cause one or more processors to: verify the user identity using a first mode; analyze a continuous video stream of the user, using a facial identification engine, to verify the user identity; request the user to perform an action while maintaining the continuous video stream; analyze the continuous video stream to verify that the requested action is performed by the user using a second engine; and authenticate the user based on results of the first mode, the facial identification engine, and the second engine. The first mode comprises one of a password verification process, a fingerprint verification process, a voice verification process, or a iris verification process.

A second system for authentication is also disclosed. The second system comprises a memory and one or more processors coupled to the memory. The memory contains instructions, that when executed by the one or more processors, cause the one or more processors of the second system to: verify the user identity using a first mode, wherein the first mode is not an audio or video-based authentication mode; request the user to enable a real-time stream of data from the user's device; analyze the real-time stream of data from the user's device to verify the user's identity using a first neural network; and authenticate the user based on results of the first mode and results from the first neural network.

Other features and advantages of the present invention will be or will become apparent to one with skill in the art upon examination of the following figures and detailed description, which illustrate, by way of examples, the principles of the present invention.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

DETAILED DESCRIPTION

Overview

User authentication is an extremely important process in many applications and industries. Because of its importance, most security-sensitive user authentication processes employ an automatic multi-factor authentication process that involves confirming a SMS message, answering a security question, entering a PIN, etc. However, even these auto multi-factor authentication processes are vulnerable to attack and hack. For example, some facial recognition authentication processes can be defeated using a picture. Voice print can also be duplicated using a previous recording of the user's voice. As such, most financial institutions employ some form of human involvement (on top of multi-factor authentication) to authenticate a user for high security sensitive situations. The cost for performing authentication with human involvement can be very expensive. Accordingly, what is needed is an automatic multi-factor authentication process that is less prone to hack and workaround such as using a picture to defeat facial recognition processes.

The cognitive multi-factor authentication system & process (hereinafter the CMFA system) as described herein provides a secure, trustworthy, and fool-proof means to authenticate a user. The CMFA system can employ two or more modes to authenticate a user, with at least one of the modes having cognitive ability including the ability to detect fakes and other means of defeating various authentication processes.

In some embodiments, the CMFA system can employ a facial recognition neural network to analyze a live (e.g., real-time, continuous) video feed of a person as one of the modes of authentication. The facial recognition neural network can be trained to identify a person face and to detect whether the video is of a real face or a picture of a face. The CMFA system can also use two or more different neural networks to analyze different data class of the video stream to authenticate the user. For example, if the video stream includes audio data, the CMFA system can use a voice authentication neural network to authenticate the user voice as a second mode of authentication. The CMFA system can also instruct the user to perform a certain action while the live video stream is active. For example, the CMFA system can instruct the user to repeat a sentence or perform an action with an object (e.g., pencil, pen, mouse, keyboard) during the live audio or video stream. The CMFA system can use a voice recognition neural network to authenticate the user voice based on the user response to the request. Additionally, the CMFA system can use an object recognition neural network to verify that the user performed the action requested such as, for example, hold up the computer mouse or a pencil.

In another example, the CMFA system can request the user to turn her face at an angle, look in a different direction, close one of the eyes, smile, or make a facial expression. In this example, the CMFA system can use an appropriate neural network to detect the facial expression or whatever expression the user was asked to perform. These combinations of cognitive authentication processes cannot be easily defeated, if not impossible, because the CMFA system's inherent unpredictability and multi-factor cognitive authentication processes. For example, the CMFA system can request the user to hold up a computer mouse with her left hand. Using both the facial recognition and object recognition neural networks, the CMFA system can continuously or intermittently verify the user facial identity and whether the user picked up the computer mouse with her left hand. This process not only confirms that the user identification is properly authenticated but that the authentication process is performed in real time.

In some embodiments, the CMFA system can also use an emotion detection neural network trained to detect duress, anxiety, and fear. If the emotion detection neural network detected a great amount of duress, anxiety, or fear on the user's face and/or voice, the CMFA system can override any other authentication methods and return a negative authentication result (e.g., deny authentication).

In some embodiments, the user can request the CMFA system to remember the user's current environment (e.g., surrounding, room, background, location). For example, the user can be using a computer in the user's home office that has a certain background. Once the user selects this option, the CMFA system can use an image and/or objection recognition neural networks to classify the background and any objects in the background and save it under a home office profile. The user can create multiple background or location profiles. In this way, the user can select a location profile during a future authentication process and the CMFA system can recall the saved profile and compare it with the current background of the live video stream. If the background does not match within a predetermined threshold, the user will not be authenticated and can be blocked for a set period of time.

In addition to the above described cognitive authentication process, the CMFA system can also request the user to additionally authenticate using traditional methods such as password and/or security question verification, and SMS confirmation. These traditional authentication methods can be referred to as non-cognitive authentication processes as they do not require an artificial intelligence or machine learning process to implement.

Cognitive Multi-Factor Authentication

Figure 1:
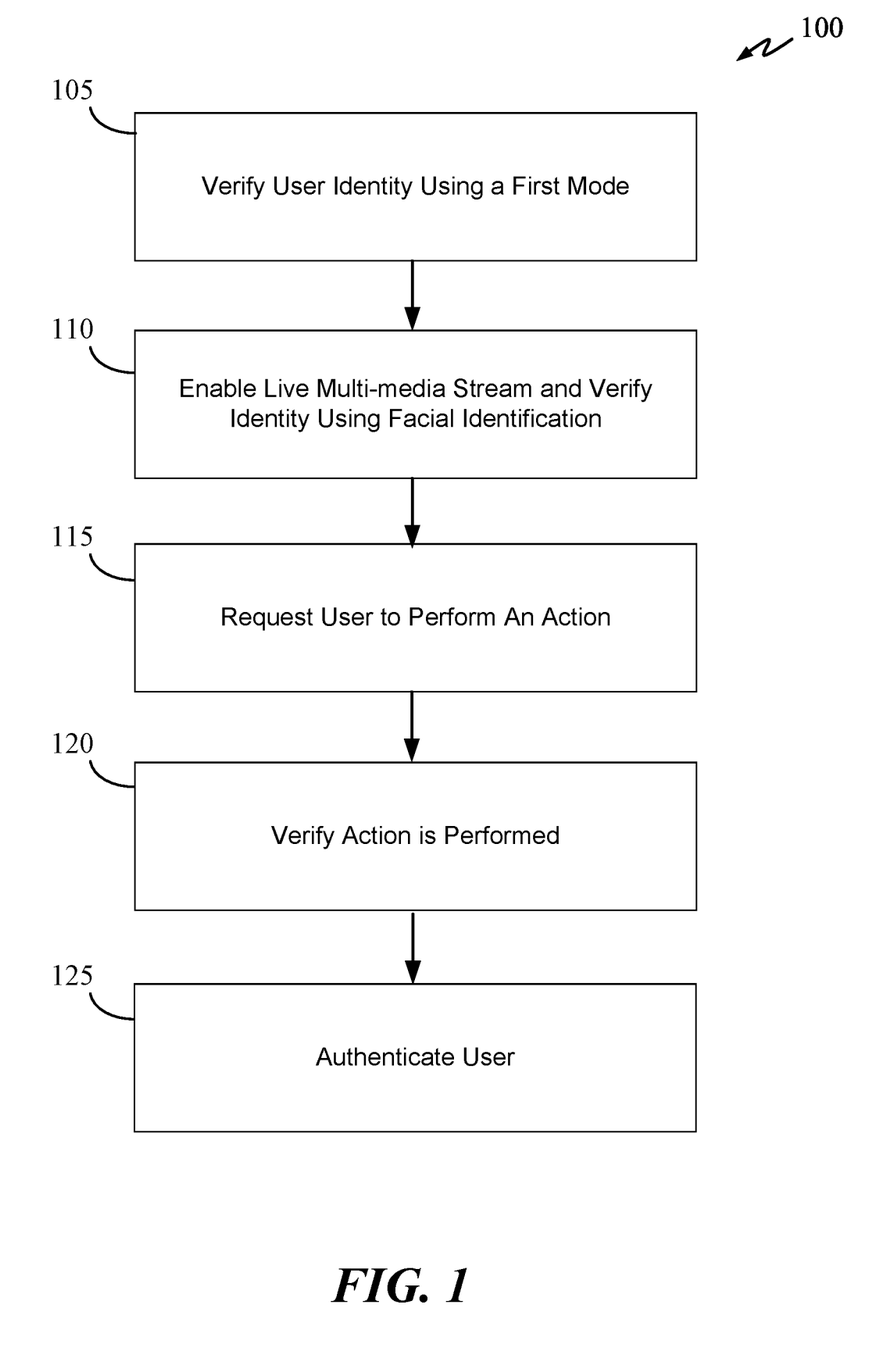
FIG. 1 illustrates a cognitive multi-factor authentication process in accordance with some embodiments of the present disclosure.

FIG. 1 illustrates an authentication process 100 in accordance with some embodiments of the present disclosure. Process 100 can be implemented by the CMFA system. Process 100 begins at subprocess 105 where the user's identity is verified using a first mode of authentication. The first mode of authentication can be a cognitive (e.g., an authentication process that uses a neural network) or non-cognitive authentication, which can include traditional authentication processes such as requiring the user to enter a password or a PIN, answering a security question, or confirming a code via SMS or a phone call to a phone number of record. In some embodiments, the first mode of authentication is a non-cognitive authentication process. Once the user is authenticated by the first mode, process 100 can further authenticate the user using one or more additional modes of authentication that are different than the first mode.

At 110, the user may have already been authenticated at subprocess 105 but not necessarily required. In some embodiments, the user must be authenticated at subprocess 105 before subprocess 110 requests the user to enable a live data stream, which can be a multi-media stream, a video only stream, or an audio only stream. Once the live multi-media or video stream with the user is enabled, subprocess 110 can verify the user's identity using a facial recognition and identification neural network or a voice identification neural network. In some embodiments, subprocess 110 can repeat the authentication process intermittently while the live video stream is active. In this way, the CMFA system can ensure that the user has not been replaced by another person or left.

Subprocess 110 can also analyze the user's face and image to determine whether the image is an image of a real face or a picture of a face using another neural network. This can be done by training the neural network to distinguish live (real) image versus a picture of a person or object. If the user fails the authentication process at 110, process 100 can end and the user will receive a negative authentication result, which can result in a denial of service or the user's account being blocked.

At subprocess 115, once the user face is verified, the CMFA system can request the user to perform an action via instructions delivered aurally or visually. The instructions can request the user to repeat a sentence being aurally or visually presented. The instructions can also request the user to perform an action such as, but not limited to, holding up an object, making a certain facial expression, doing something with part of the user's body (e.g., wink, smile, look to the left) while the live video stream is active. The CMFA system can also send instructions to the user email address and/or phone number of record.

At subprocess 120, the CMFA system can analyze, using an image or object classification neural network, the video data portion of the live multi-media stream (or video only data stream) to determine whether the user has performed the requested action such as to smile, look to the left, pick up an object, etc. The CMFA system can also analyze, using an audio classification neural network) the audio data portion of the live multi-media stream (or audio only data stream) to determine whether the user has read the requested words or sentence. For example, subprocess 120 can display one or more words on the user's display and instruct the user to read the one or more words. Subprocess 120 can also instructs the user by playing an audio through the user's device. Alternatively, subprocess 120 can instruct the user using both aural and visual presentation methods. For instance, subprocess 120 can instruct the user aurally to repeat the sentence "hello word, my name is Joe Smith" and/or display the sentence on the user's screen and instruct the user to read it out loud into the microphone.

The CMFA system can also analyze the audio data using a voice recognition/identification neural network to further authenticate the user using voice fingerprint. The CMFA system can also employ a speech-to-text classification neural network to verify whether the user has read the texts or followed the texts' instructions correctly. For example, the instructions can request the user to state her name and date of birth. In another example, the instructions can request the user to read a sentence. The CMFA system can analyze the audio data using a voice recognition/identification and/or speech-to-text neural network to determine whether the user has the correct voice print and/or stated her birthday correctly.

Still further, if the instruction at subprocess 115 is a demand for the user to interact with an object such as holding up a pencil, the CMFA system can verify whether the action is performed correctly using an object recognition neural network to verify whether the user is holding up a pencil as requested. Subprocess 115 can be done in conjunction with a facial recognition neural network to verify that it is the user that is performing the requested task. These interactive requests eliminate the possibility that the user face/image or likeness is being reproduced by a photo, a fake image/video generated by a deepfake AI system.

At subprocess 125, once the action is verified at subprocess 120 the user's identity can be authenticated. In some embodiments, the CMFA system can deny authentication if any of the authentication subprocess fails.

Figure 2:
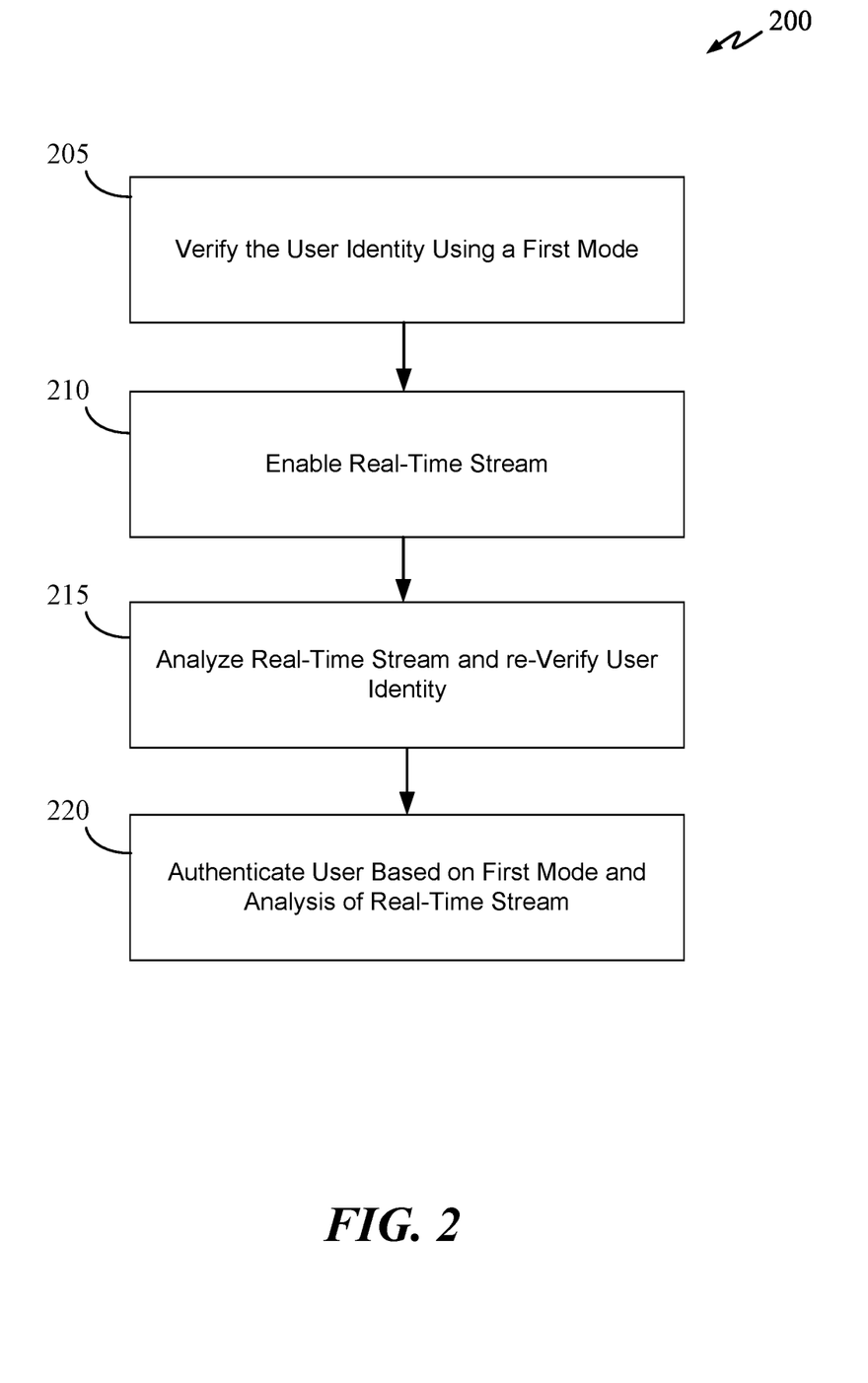
FIGS. 2-3 illustrate cognitive multi-factor authentication processes in accordance with some embodiments of the present disclosure.

FIG. 2 illustrates a cognitive authentication process 200 in accordance with some embodiments of the present disclosure. Process 200 starts at subprocess 205 where the user's identity is verified using a first mode. In some embodiments, the first mode is not an audio or video data analysis. In other words, the first mode is not a voice recognition/identification authentication process and also not a facial recognition/identification authentication process. The first mode can be a non-cognitive authentication process based on a password, one or more security questions, a PIN, and/or a code confirmation via SMS (short message service) or phone call.

Once the user is authenticated at subprocess 205, process 200 can enable a real-time audio only, video only, or audio & video stream session with the user. The real-time (e.g., live) streaming session can be used to analyze the user identity intermittently during the streaming session. If the stream is interrupted or the user's identity cannot be verified during the real-time streaming session, the authentication process can be terminated, which results in the user not being authenticated.

At subprocess 215, the real-time stream is analyzed to further verify or re-verify the user identity using data obtained from the real-time stream, which can be audio data, video data, or a combination of audio and video data. For audio data, subprocess 215 can use an audio classification neural network such as a voice recognition and identification neural network to verify the user's voice. Subprocess 215 can also classify the audio data using a speech-to-text neural network to determine what the user said. For example, subprocess 215 can further include a process where the user is instructed to answer a question, repeat a sentence, etc. In response to requiring the user to follow the system's instructions, subprocess 215 can analyze the user's response using a speech-to-text classification neural network or an NLP (natural language processing) neural network to validate the user's response.

For video data, subprocess 215 can use an image, object, and/or facial classification neural network to verify the user's identity. For example, the video data can be used to verify the user's identity using a facial recognition/identification neural network. During the streaming session, the system can also request the user to hold up an object like a computer mouse. In this example, subprocess 215 can use an object classifier to determine whether a computer mouse is being held up by the user or by someone other than the user. The system can also instruct the user to make a gesture using the user's hand or make a facial expression. In this example, subprocess 215 can use an object classifier and/or facial classifier to determine whether the user (and not someone else) made the requested hand gesture and/or facial expression.

At subprocess 220, the user can be authenticated if the user's identify is verified in the first mode at subprocess 205 and that the user successfully followed the system's instructions, which is verified at subprocess 215.

Figure 3:
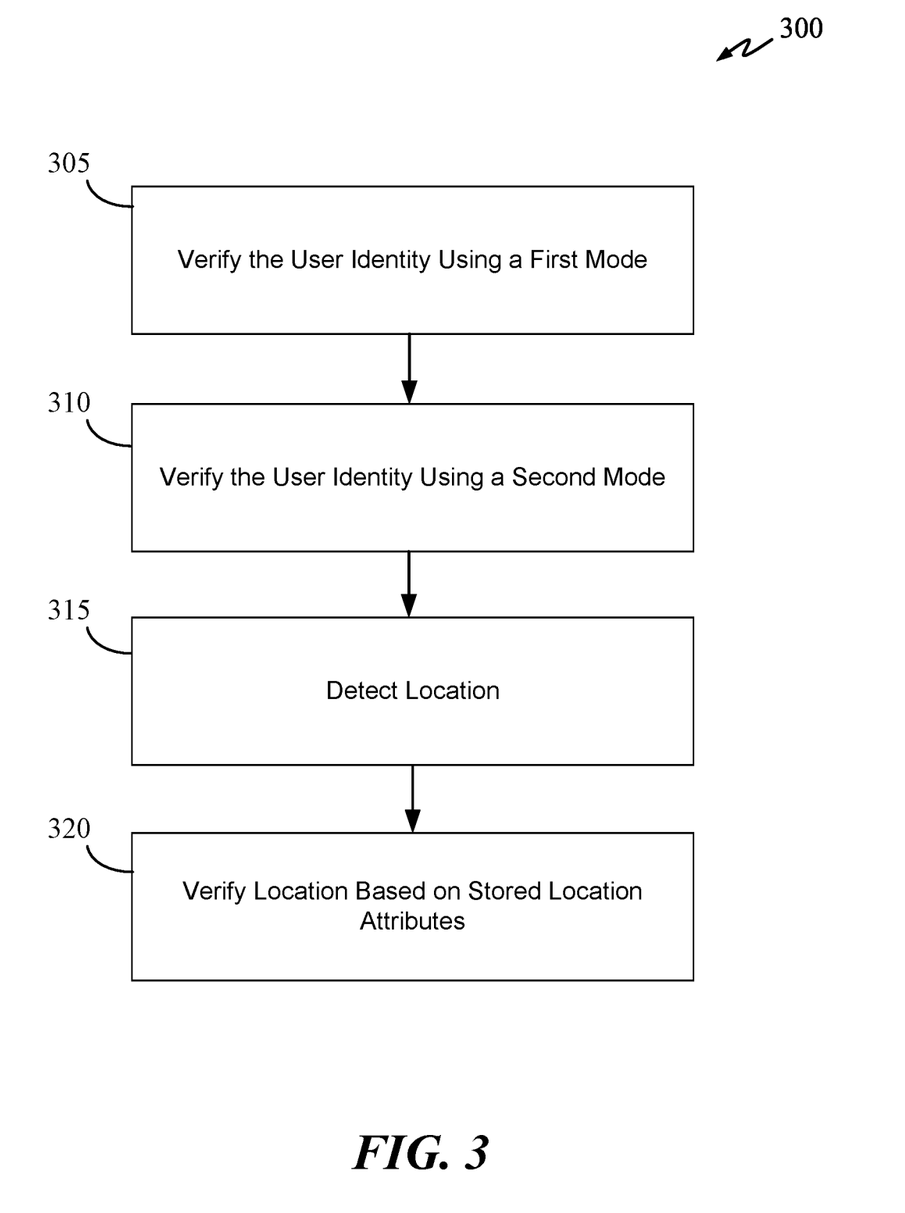

FIG. 3 illustrates a cognitive authentication process 300 in accordance with some embodiments of the present disclosure. Authentication process 300 is a multi-factor authentication process that also uses the background of the location of the user to further authenticate the user identity. For example, assuming a user only works in two different locations such as the company office and the home office. Each time the user logs into the system, the CMFA system can use an object recognition/identification neural network recognize and identify one or more objects in the background of the user's location using an object recognition neural network. The CMFA system can store the identification of the objects and their location as attributes of the location. For instance, in the company office, the office's background has a painting on the left and a flower vase on the right. The description of these objects and their locations can be stored as attributes of the user's company office. Similarly, at home, the home office can have a window on the right of the wall and a picture of San Francisco on the left of the wall. These objects can be recognized by an object recognition/identification neural network and stored as attributes of the user's home office. Accordingly, each time the user logs in, the CMFA system can perform objects identification of the user's background to determine where the user is logging into the system. This can prevent someone from logging into the system using the user's information at a different or unknown location.

In some embodiments, authentication process 300 starts by verifying the user identity using a first mode (subprocess 305), which is a non-cognitive authentication mode such as using a username and password or a pin. Once verified, the user identity can be verified using a second mode (subprocess 310), which can be a cognitive authentication mode such as voice recognition and/or facial recognition. In addition or in place of voice recognition and/or facial recognition at subprocess 305, a location verification can be performed at subprocesses 315 and 320. At 315, process 300 can optionally ask for the user's current location. The system can provide the user with options from previously stored and verified locations (e.g., home office) of the user. At subprocess 315, the CMFA system can analyze the image of the background and detect one or more objects. the CMFA system can also extract various attributes of each object such as, but not limited to, relative location of object with respect to each other, physical location via IP address, material, color, description (e.g., painting, vase), etc. At subprocess 320, the detected objects and/or their attributes are compared with the objects and/or attributes of the user's previously known locations. If the comparison yields a match between the detected objects and/or their attributes with objects and/or attributes of stored locations for the user, then the user's location is verified. As noted, verifying the user's office location can serve as an additional security measure. For example, verifying the use IP address location alone is not sufficient as usage of VPNs can defeat that security measure.

Figure 4A:
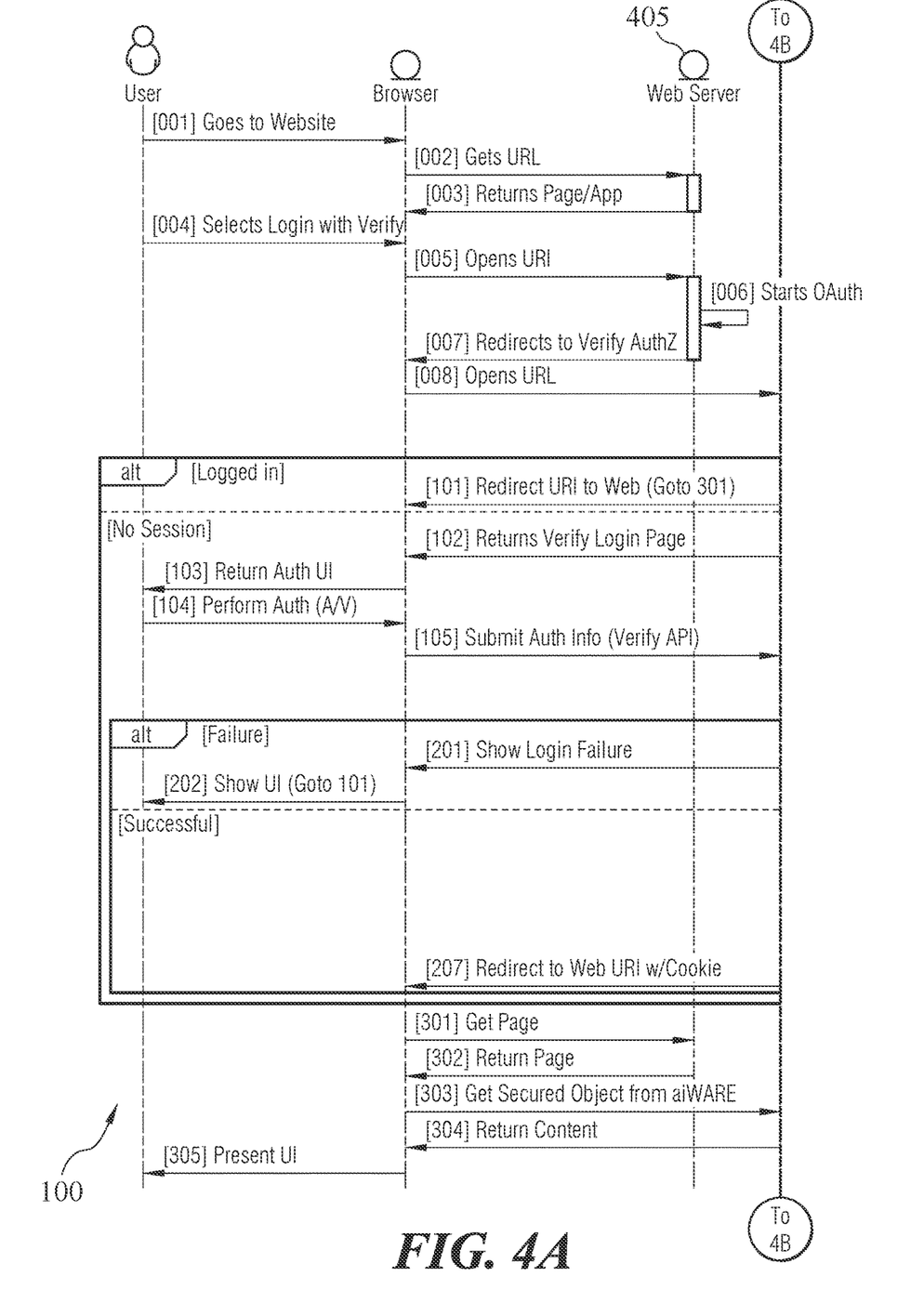
FIGS. 4A-4B illustrate a process flow of an authentication process in accordance with some embodiments of the present disclosure.
Figure 4B:
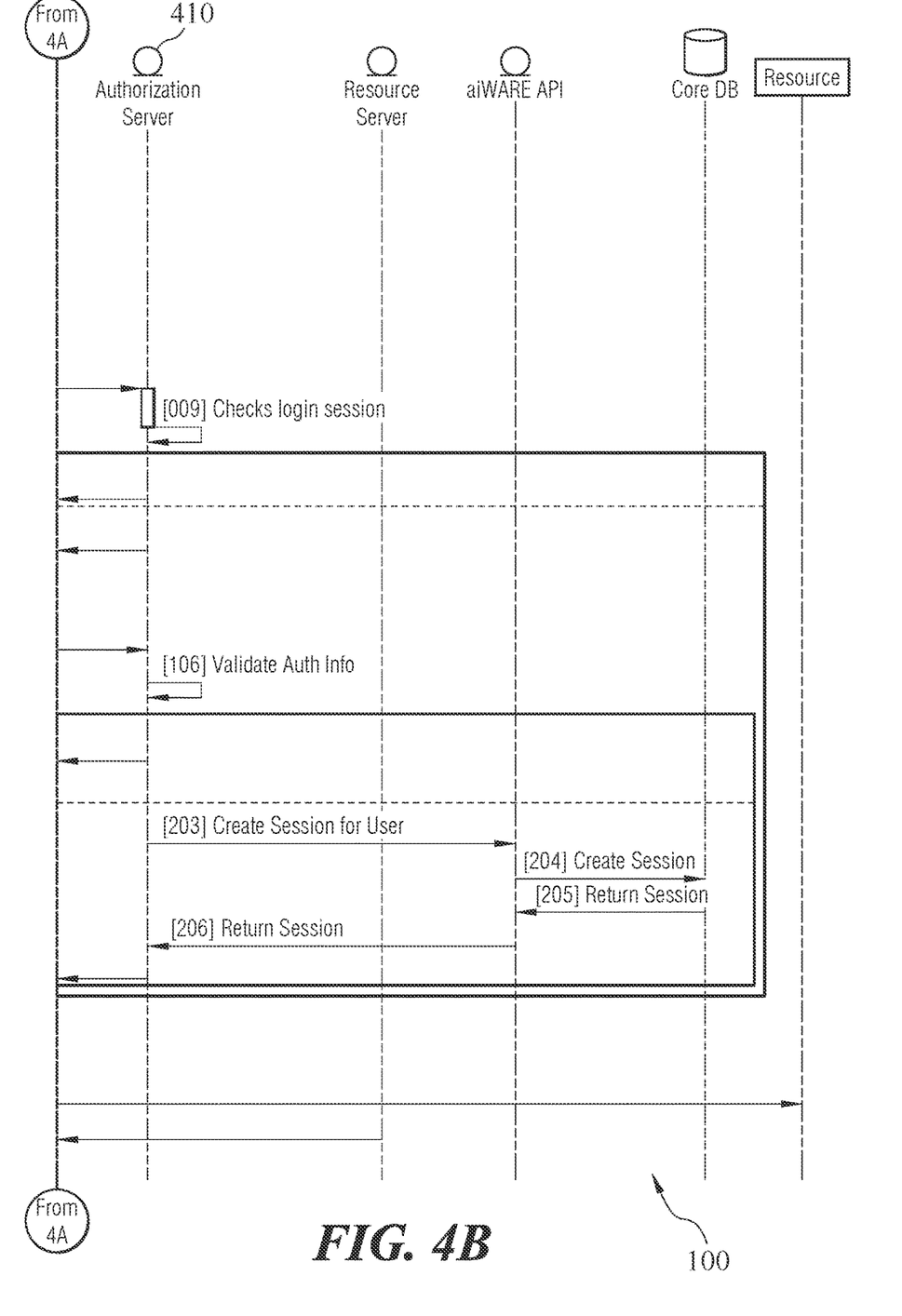

FIGS. 4A-4B illustrate a flow diagram 400 of a process for authenticating a user on a third-party website using the CMFA system in accordance with some embodiments of the present disclosure. At steps [001]-[003], the user goes to a website (hosted by web server 405) such as a bank, a social media website, a company website, etc., using a browser. At step [004], the user selects to login with "Verify" (the CMFA system). Once this option is selected, the user browser is directed to an authentication server 410, which authenticates the user using one or more of processes 100, 200, or 300 as described with respect to FIGS. 1, 2, and 3 (see also steps [101]-[106]). Once the user is authenticated by server 410, the user is then allowed to access the secured section of the website.

Additional Embodiments

A first method for authenticating a user is disclosed. The first method comprises: requesting the user to verify identity using a first mode, wherein the first mode comprises one of a password verification process, a fingerprint verification process, a voice verification process, or a iris verification process; analyzing a continuous video stream of the user, using a facial identification engine, to verify the user identity; requesting the user to perform an action while maintaining the continuous video stream; analyzing the continuous video stream to verify that the requested action is performed by the user using a second engine; and authenticating the user based on results of the first mode, the facial identification engine, and the second engine.

In the first method, the facial identification engine and the second engine can be the same engine. They can also be different engines. The second engine can be a voice identification engine or an object identification engine.

In the first method, requesting the user to perform an action can include: requesting the user to turn the user's head in a different direction; and analyzing the user's face to verify the user identity while the user's face is looking at the different direction. Requesting the user to perform an action can also include: requesting the user o read out loud a text displayed on a displaying device; receiving an input audio data in response to requesting the user to read out loud the text; analyzing the input audio data to verify the user identity, using a voice verification engine; and transcribing the input audio data to verify that the text displayed is read correctly.

Still further, requesting the user to perform an action can include: requesting the user to follow audio or on-screen instructions; receiving an input audio data in response to requesting the user to follow audio or on-screen instructions; analyzing the input audio data to verify the user identity, using a voice verification engine; and transcribing the input audio data to verify that the user followed the audio or on-screen instructions.

Still further, requesting the user to perform an action can include: requesting the user to follow audio or on-screen instructions; receiving an input video data in response to requesting the user to follow audio or on-screen instructions; analyzing an input video data, using an object recognition engine, to verify that the user followed the audio or on-screen instructions.

The first method can further include analyzing the continuous video stream to verify the user identity using the facial identification engine while the user is following the audio or on-screen instructions. Requesting the user to follow audio or on-screen instructions can include requesting the user to perform a specific act with the user's hand, object, or a part of the user's face. The specific act can be a gesture with one or more of the user's hands or fingers or an action with a desktop object.

In the first method, the user can be allowed to change the user's password if the user identification is authenticated.

A second method for authenticating a user is also disclosed. The second method can include: verifying the user identity using a first mode, wherein the first mode is not an audio or video-based authentication mode; requesting the user to enable a real-time stream of data from the user's device; analyzing the real-time stream of data from the user's device to verify the user's identity using a first neural network; and authenticating the user based on results of the first mode and results from the first neural network.

In the second method, requesting the user to enable a real-time stream of data from the user's device can include providing the user with an instruction to perform an action. The instruction can include instructions to read a sentence, which can be orally or visually presented to the user. The instruction can also include instructions to perform an action in front of a camera. The instruction can also include instructions requesting the user to perform a specific act with the user's hand, object, or a portion of the user's face.

The second method can further include analyzing the video stream to verify the user identity using a facial identification engine while the user is performing the action in front of the camera.

A first system for authenticating a user can include a memory; and one or more processors coupled to the memory. The memory can include instructions, when executed by the one or more processors, can cause the one or more processors to: verify the user identity using a first mode, where the first mode comprises one of a password verification process, a fingerprint verification process, a voice verification process, or a iris verification process; analyze a continuous video stream of the user, using a facial identification engine, to verify the user identity; request the user to perform an action while maintaining the continuous video stream; analyze the continuous video stream to verify that the requested action is performed by the user using a second engine; and authenticate the user based on results of the first mode, the facial identification engine, and the second engine.

A second system for authenticating a user can include a memory; and one or more processors coupled to the memory. The memory can include instructions, when executed by the one or more processors, can cause the one or more processors to: verify the user identity using a first mode, wherein the first mode is not an audio or video-based authentication mode; request the user to enable a real-time stream of data from the user's device; analyze the real-time stream of data from the user's device to verify the user's identity using a first neural network; and authenticate the user based on results of the first mode and results from the first neural network.

In the second system, the request to enable the real-time stream of data from the user's device can include providing the user with an instruction to perform an action.

System Architecture

Figure 5:
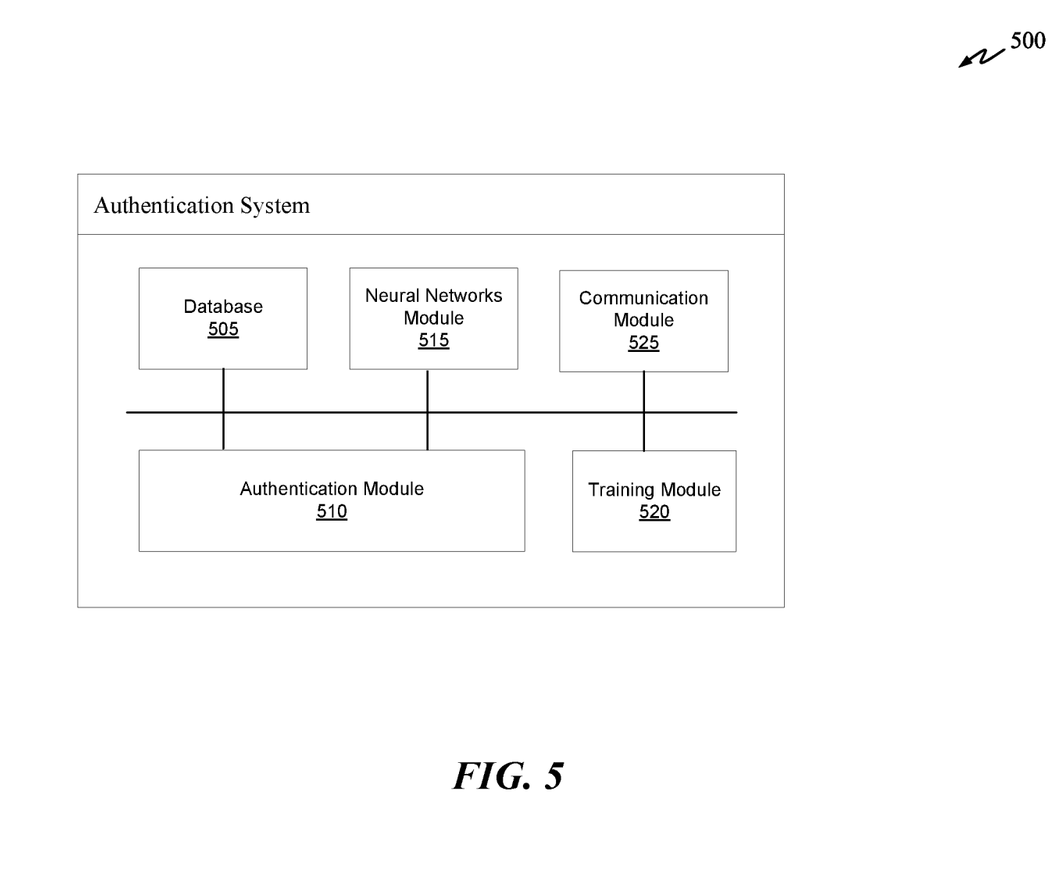
FIG. 5 illustrates a block diagram of a training and classification system in accordance with some embodiments of the present disclosure.

FIG. 5 is a system diagram of an exemplary authentication system 500 to perform cognitive multi-factor authentication in accordance with some embodiments of the present disclosure. System 500 may include a database 505, an authentication module 510, a neural networks module 515, a training module 520, and a communication module 525. System 500 may reside on a single server or may be distributed at various locations on a network. For example, one or more components (e.g., 505, 510, 510, etc.) of system 500 may be distributed across various locations throughout a network. Each component or module of system 500 may communicate with each other and with external entities via communication module 525. Each component or module of system 500 may include its own sub-communication module to further facilitate with intra and/or inter-system communication.

Database 505 may contain customer data, authentication data, training data sets that can be used by training module 520 to train various neural networks of neural network module 515.

Neural networks module 515 may include various neural networks pre-trained to perform biometric recognition & identification (e.g., facial, voice, fingerprint, iris, finger vein), object classification, image classification, expression classification, emotion classification, and deepfake detection classification. Deepfake is an AI generated image or video that can be presented as a real image or video.

Training module 520 includes algorithms and instructions that, when executed by a processor, cause the processor to train one or more neural networks to perform biometric recognition & identification (e.g., facial, voice, fingerprint), object classification, image classification, expression classification, emotion classification, and deepfake detection classification.

Figure 6:
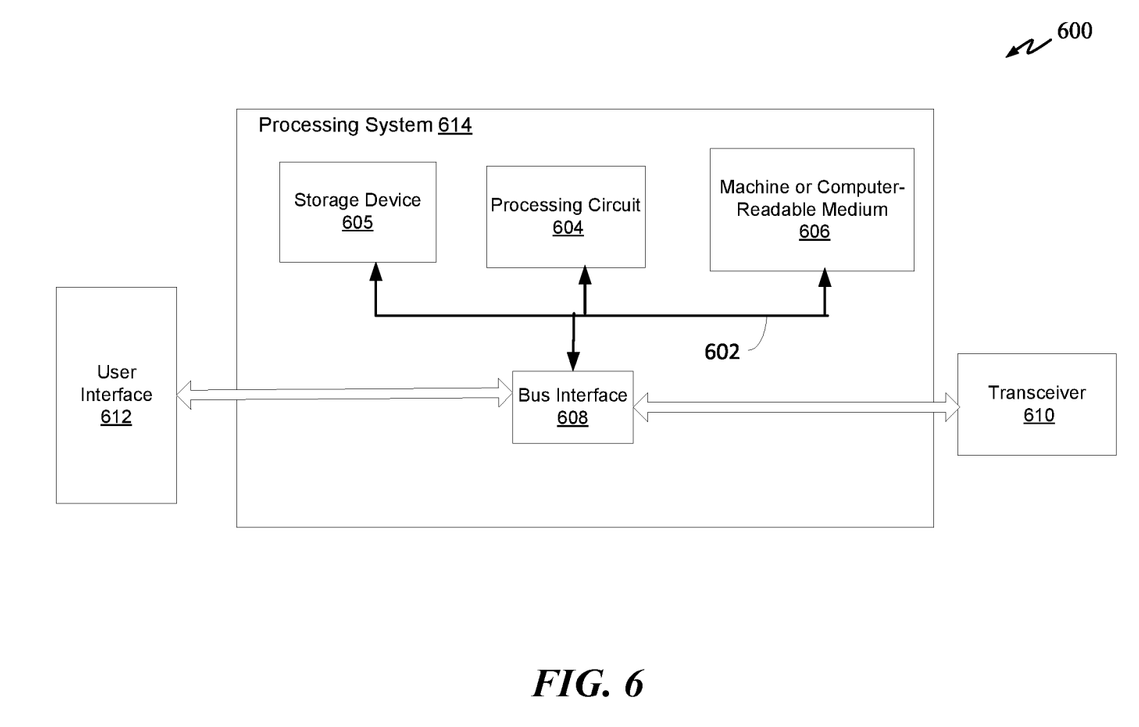
FIG. 6 illustrates a block diagram of a training and classification system in accordance with some embodiments of the present disclosure.

FIG. 6 illustrates an exemplary overall system or apparatus 600 in which processes 100 and 200 can be implemented. In accordance with various aspects of the disclosure, an element, or any portion of an element, or any combination of elements may be implemented with a processing system 614 that includes one or more processing circuits 604. Processing circuits 604 may include microprocessing circuits, microcontrollers, digital signal processing circuits (DSPs), field programmable gate arrays (FPGAs), programmable logic devices (PLDs), state machines, gated logic, discrete hardware circuits, and other suitable hardware configured to perform the various functionalities described throughout this disclosure. That is, the processing circuit 604 may be used to implement any one or more of the processes described above and illustrated in FIGS. 1 and 2.

In the example of FIG. 6, the processing system 614 may be implemented with a bus architecture, represented generally by the bus 602. The bus 602 may include any number of interconnecting buses and bridges depending on the specific application of the processing system 614 and the overall design constraints. The bus 602 may link various circuits including one or more processing circuits (represented generally by the processing circuit 604), the storage device 604, and a machine-readable, processor-readable, processing circuit-readable or computer-readable media (represented generally by a non-transitory machine-readable medium 606). The bus 602 may also link various other circuits such as timing sources, peripherals, voltage regulators, and power management circuits, which are well known in the art, and therefore, will not be described any further. The bus interface 608 may provide an interface between bus 602 and a transceiver 614. The transceiver 610 may provide a means for communicating with various other apparatus over a transmission medium. Depending upon the nature of the apparatus, a user interface 612 (e.g., keypad, display, speaker, microphone, touchscreen, motion sensor) may also be provided.

The processing circuit 604 may be responsible for managing the bus 602 and for general processing, including the execution of software stored on the machine-readable medium 606. The software, when executed by processing circuit 604, causes processing system 614 to perform the various functions described herein for any particular apparatus. Machine-readable medium 606 may also be used for storing data that is manipulated by processing circuit 604 when executing software.

One or more processing circuits 604 in the processing system may execute software or software components. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory or storage contents. Information, arguments, parameters, data, etc. may be passed, forwarded, or transmitted via any suitable means including memory sharing, message passing, token passing, network transmission, etc.

For example, instructions (e.g., codes) stored in the non-transitory computer readable memory, when executed, may cause the processors to: select, using a trained layer selection neural network, a plurality of layers from an ecosystem of pre-trained neural networks based on one or more attributes of the input file; construct, in real-time, a new neural network using the plurality of layers selected from one or more neural networks in the ecosystem, wherein the new neural network is fully-layered, and the selected plurality of layers are selected from one or more pre-trained neural network; and classify the input file using the new fully-layered neural network.

The software may reside on machine-readable medium 606. The machine-readable medium 606 may be a non-transitory machine-readable medium. A non-transitory processing circuit-readable, machine-readable or computer-readable medium includes, by way of example, a magnetic storage device (e.g., solid state drive, hard disk, floppy disk, magnetic strip), an optical disk (e.g., digital versatile disc (DVD), Blu-Ray disc), a smart card, a flash memory device (e.g., a card, a stick, or a key drive), RAM, ROM, a programmable ROM (PROM), an erasable PROM (EPROM), an electrically erasable PROM (EEPROM), a register, a removable disk, a hard disk, a CD-ROM and any other suitable medium for storing software and/or instructions that may be accessed and read by a machine or computer. The terms "machine-readable medium", "computer-readable medium", "processing circuit-readable medium" and/or "processor-readable medium" may include, but are not limited to, non-transitory media such as portable or fixed storage devices, optical storage devices, and various other media capable of storing, containing or carrying instruction(s) and/or data. Thus, the various methods described herein may be fully or partially implemented by instructions and/or data that may be stored in a "machine-readable medium," "computer-readable medium," "processing circuit-readable medium" and/or "processor-readable medium" and executed by one or more processing circuits, machines and/or devices. The machine-readable medium may also include, by way of example, a carrier wave, a transmission line, and any other suitable medium for transmitting software and/or instructions that may be accessed and read by a computer.

The machine-readable medium 606 may reside in the processing system 614, external to the processing system 614, or distributed across multiple entities including the processing system 614. The machine-readable medium 606 may be embodied in a computer program product. By way of example, a computer program product may include a machine-readable medium in packaging materials. Those skilled in the art will recognize how best to implement the described functionality presented throughout this disclosure depending on the particular application and the overall design constraints imposed on the overall system.

One or more of the components, processes, features, and/or functions illustrated in the figures may be rearranged and/or combined into a single component, block, feature or function or embodied in several components, steps, or functions. Additional elements, components, processes, and/or functions may also be added without departing from the disclosure. The apparatus, devices, and/or components illustrated in the Figures may be configured to perform one or more of the methods, features, or processes described in the Figures. The algorithms described herein may also be efficiently implemented in software and/or embedded in hardware.

Note that the aspects of the present disclosure may be described herein as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and processes have been described above generally in terms of their functionality. Whether such functionality is implemented as hardware or software depends upon the particular application and design constraints imposed on the overall system.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

CONCLUSION

The enablements described above are considered novel over the prior art and are considered critical to the operation of at least one aspect of the disclosure and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus, if an element can be understood in the context of this specification as including more than one meaning, then its use must be understood as being generic to all possible meanings supported by the specification and by the word or words describing the element.

The definitions of the words or drawing elements described above are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

In the foregoing description and in the figures, like elements are identified with like reference numerals. The use of "e.g.," "etc.," and "or" indicates non-exclusive alternatives without limitation, unless otherwise noted. The use of "including" or "includes" means "including, but not limited to," or "includes, but not limited to," unless otherwise noted.

As used above, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B", when used in conjunction with open-ended language such as "comprising" can refer, in one embodiment, to A only (optionally including entities other than B); in another embodiment, to B only (optionally including entities other than A); in yet another embodiment, to both A and B (optionally including other entities). These entities may refer to elements, actions, structures, processes, operations, values, and the like.

The invention claimed is:

1. A method for authenticating a user, the method comprising:
   requesting the user to verify identity using a first mode, wherein the first mode comprises one of a password verification process, a fingerprint verification process, a voice verification process, or a iris verification process;
   analyzing a continuous video stream of the user, using a facial identification engine, to verify the user identity;
   requesting the user to perform an action while maintaining the continuous video stream;
   analyzing the continuous video stream, using the second engine, to verify that the requested action is performed by the user; and
   authenticating the user based on results of the first mode, the facial identification engine, and the second engine,
   wherein the continuous video stream is analyzed using a multi-stage authentication process that includes sequential verification steps, with each step focused on different biometric features of the user,
   wherein the system provides real-time feedback to the user regarding the performed action and prompts the user to repeat the action if the action does not meet a predetermined threshold for successful authentication,
   wherein the continuous video stream is analyzed in conjunction with additional data streams, including biometric sensor data, to enhance the confidence score associated with the user authentication,
   wherein the system continuously monitors facial expressions during the video stream and analyzes the expressions to detect any discrepancies with expected user behavior, and
   wherein the authentication thresholds are adjusted dynamically based on user-specific historical data, wherein previous authentication attempts are used to modify the criteria for future authentication sessions.

2. The method of claim 1, wherein the facial identification engine and the second engine are the same engine or different engines.

3. The method of claim 2, wherein the second engine is a voice identification engine or an object identification engine.

4. The method of claim 1, wherein requesting the user to perform an action comprises:
   requesting the user to turn the user's head in a different direction; and
   analyzing the user's face to verify the user identity while the user's face is looking at the different direction.

5. The method of claim 1, wherein requesting the user to perform an action comprises:
   requesting the user to read out loud a text displayed on a displaying device;
   receiving an input audio data in response to requesting the user to read out loud the text;
   analyzing the input audio data to verify the user identity, using a voice verification engine; and transcribing the input audio data to verify that the text displayed is read correctly.

6. The method of claim 1, wherein requesting the user to perform an action comprises:
   requesting the user to follow audio or on-screen instructions;
   receiving an input audio data in response to requesting the user to follow audio or on-screen instructions;
   analyzing the input audio data to verify the user identity, using a voice verification engine; and
   transcribing the input audio data to verify that the user followed the audio or on-screen instructions.

7. The method of claim 6, further comprising analyzing the continuous video stream to verify the user identity using the facial identification engine while the user is following the audio or on-screen instructions.

8. The method of claim 1, wherein requesting the user to perform an action comprises:
   requesting the user to follow audio or on-screen instructions;
   receiving an input video data in response to requesting the user to follow audio or on-screen instructions;
   analyzing an input video data, using an object recognition engine, to verify that the user followed the audio or on-screen instructions.

9. The method of claim 8, further comprising analyzing the continuous video stream to verify the user identity using the facial identification engine while the user is following the audio or on-screen instructions.

10. The method of claim 8, wherein requesting the user to follow audio or on-screen instructions comprises requesting the user to perform a specific act with the user's hand, object, or a part of the user's face.

11. The method of claim 10, wherein the specific act comprises a gesture with one or more of the user's hands or fingers or an action with a desktop object.

12. A method for authenticating a user, the method comprising:
   verifying the user identity using a first mode, wherein the first mode is not an audio or video-based authentication mode;
   requesting the user to enable a real-time stream of data from the user's device;
   analyzing the real-time stream of data from the user's device to verify the user's identity using a first neural network; and
   authenticating the user based on results of the first mode and results from the first neural network,
   wherein the continuous video stream is analyzed using a multi-stage authentication process that includes sequential verification steps, with each step focused on different biometric features of the user,
   wherein the system provides real-time feedback to the user regarding the performed action and prompts the user to repeat the action if the action does not meet a predetermined threshold for successful authentication,
   wherein the continuous video stream is analyzed in conjunction with additional data streams, including biometric sensor data, to enhance the confidence score associated with the user authentication,
   wherein the system continuously monitors facial expressions during the video stream and analyzes the expressions to detect any discrepancies with expected user behavior, and
   wherein the authentication thresholds are adjusted dynamically based on user-specific historical data, wherein previous authentication attempts are used to modify the criteria for future authentication sessions.

13. The method of claim 12, wherein requesting the user to enable a real-time stream of data from the user's device comprises providing the user with an instruction to perform an action.

14. The method of claim 13, wherein the instruction comprises instructions to read a sentence.

15. The method of claim 13, wherein the instruction comprises instructions to perform an action in front of a camera, and wherein the real-time stream of data comprises a video stream.

16. The method of claim 12, further comprising analyzing the video stream to verify the user identity using a facial identification engine while the user is performing the action in front of the camera.

17. The method of claim 11, wherein the specific act comprises a gesture with one or more of the user's hands or fingers or an action with a desktop object.

18. A system for authenticating a user, the system comprising:
   a memory; and
   one or more processors coupled to the memory, wherein the memory comprises instructions, which when executed by the one or more processors, cause the one or more processors to:
      verify the user identity using a first mode, wherein the first mode is not an audio or video-based authentication mode;
      request the user to enable a real-time stream of data from the user's device;
      analyze the real-time stream of data from the user's device to verify the user's identity using a first neural network; and
   authenticate the user based on results of the first mode and results from the first neural network,
      wherein the continuous video stream is analyzed using a multi-stage authentication process that includes sequential verification steps, with each step focused on different biometric features of the user,
      wherein the system provides real-time feedback to the user regarding the performed action and prompts the user to repeat the action if the action does not meet a predetermined threshold for successful authentication,
      wherein the continuous video stream is analyzed in conjunction with additional data streams, including biometric sensor data, to enhance the confidence score associated with the user authentication,
      wherein the system continuously monitors facial expressions during the video stream and analyzes the expressions to detect any discrepancies with expected user behavior, and
      wherein the authentication thresholds are adjusted dynamically based on user-specific historical data, wherein previous authentication attempts are used to modify the criteria for future authentication sessions.

19. The system of claim 18, wherein the request to enable the real-time stream of data from the user's device comprises providing the user with an instruction to perform an action.

20. The system of claim 18, wherein the first neural network comprises an object identification neural network configured to identify one or more objects in the background and to collect one or more attributes on each object, wherein authenticate the user comprises comparing the collected one or more attributes of each object with stored attributes of objects of known locations of the user.

* * * * *